United States Patent [19]

Bisping et al.

[11] Patent Number: 4,836,729
[45] Date of Patent: Jun. 6, 1989

[54] ANCHORING UNIT FOR USE IN STRUCTURES WITH INTERNAL OPEN SPACES

[75] Inventors: Heinz Bisping, Munich; Alfred Gahler, Wolfratschausen; Armin Hoffmann, Germering; Franz Popp, Puchheim, all of Fed. Rep. of Germany

[73] Assignee: Hilti Aktiengesellschaft

[21] Appl. No.: 181,329

[22] Filed: Apr. 13, 1988

[30] Foreign Application Priority Data

Apr. 13, 1987 [DE] Fed. Rep. of Germany ....... 3712463

[51] Int. Cl.$^4$ .............................................. F16B 39/02
[52] U.S. Cl. ..................................... 411/82; 411/258; 405/260
[58] Field of Search ............... 411/42, 69, 82, 258, 411/301, 302; 405/260, 261

[56] References Cited

U.S. PATENT DOCUMENTS

| | | | |
|---|---|---|---|
| 3,901,039 | 8/1975 | Lundkvist | 405/260 |
| 4,063,582 | 12/1977 | Fischer | 411/82 |
| 4,712,957 | 12/1987 | Edwards et al. | 411/82 |

FOREIGN PATENT DOCUMENTS

| | | | |
|---|---|---|---|
| 2515950 | 10/1976 | Fed. Rep. of Germany | 411/69 |
| 2550954 | 5/1977 | Fed. Rep. of Germany | 411/82 |
| 2830073 | 1/1980 | Fed. Rep. of Germany | 411/82 |

OTHER PUBLICATIONS

Brochure entitled "Applications and Products", German Hilti GmbH, 1985, p. 43.

*Primary Examiner*—Gary L. Smith
*Assistant Examiner*—Douglas E. Ringel
*Attorney, Agent, or Firm*—Toren, McGeady & Associates

[57] ABSTRACT

An anchoring unit is made up of a screen-type sleeve and an insert sleeve to be placed into the screen-type sleeve. The unit is anchored by a hardenable mass. After the screen-type sleeve is inserted into a borehole in a structure with internal open spaces, the hardenable mass is injected into the screen-type sleeve. When the insert sleeve is placed into the screen-type sleeve, the hardenable mass is forced outwardy through openings in the screen-type sleeve into the open spaces in the structure. The two sleeves each have an inside surface and an outside surface with alternating projecting surfaces and recessed surfaces to facilitate a positive lock with the hardenable mass. Further, the alternating surfaces improve the distribution of the hardenable mass. Preferably, the two sleeves are formed of a plastics material. A fastening element can be inserted into the insert sleeve for securing an object to the structure.

8 Claims, 3 Drawing Sheets

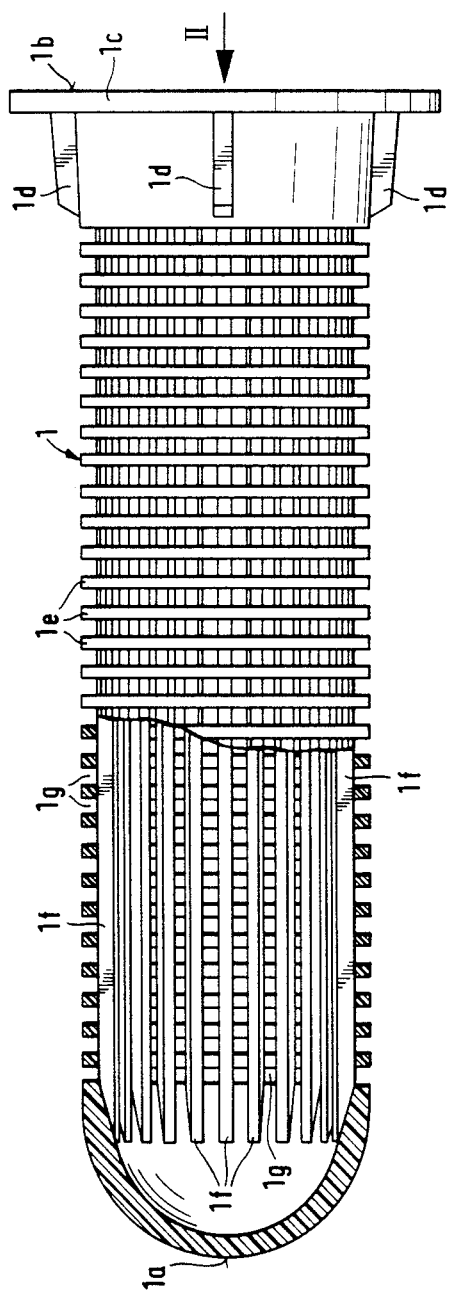
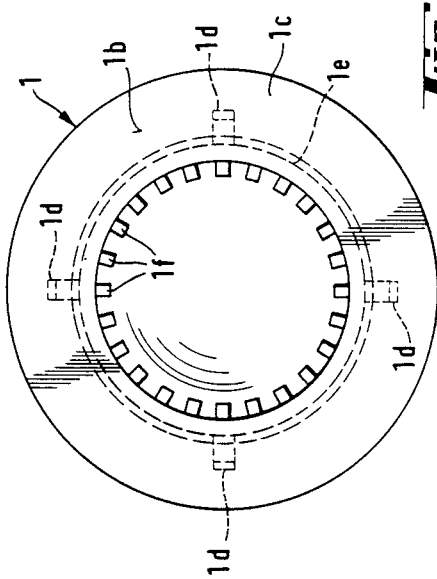
Fig. 1
Fig. 2

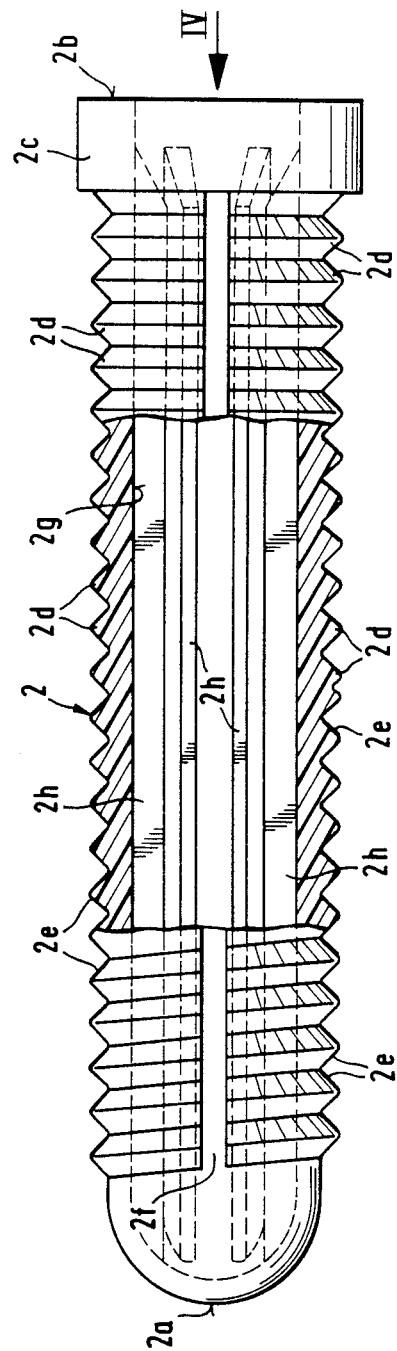
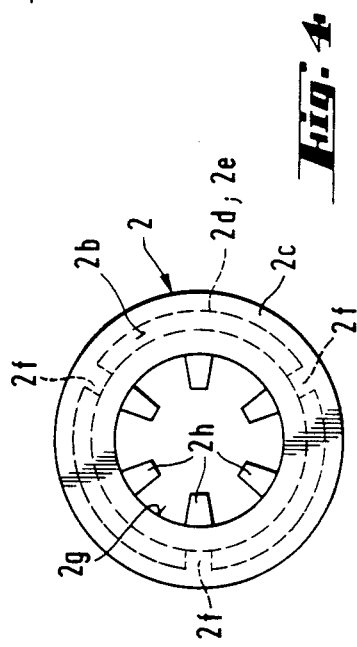

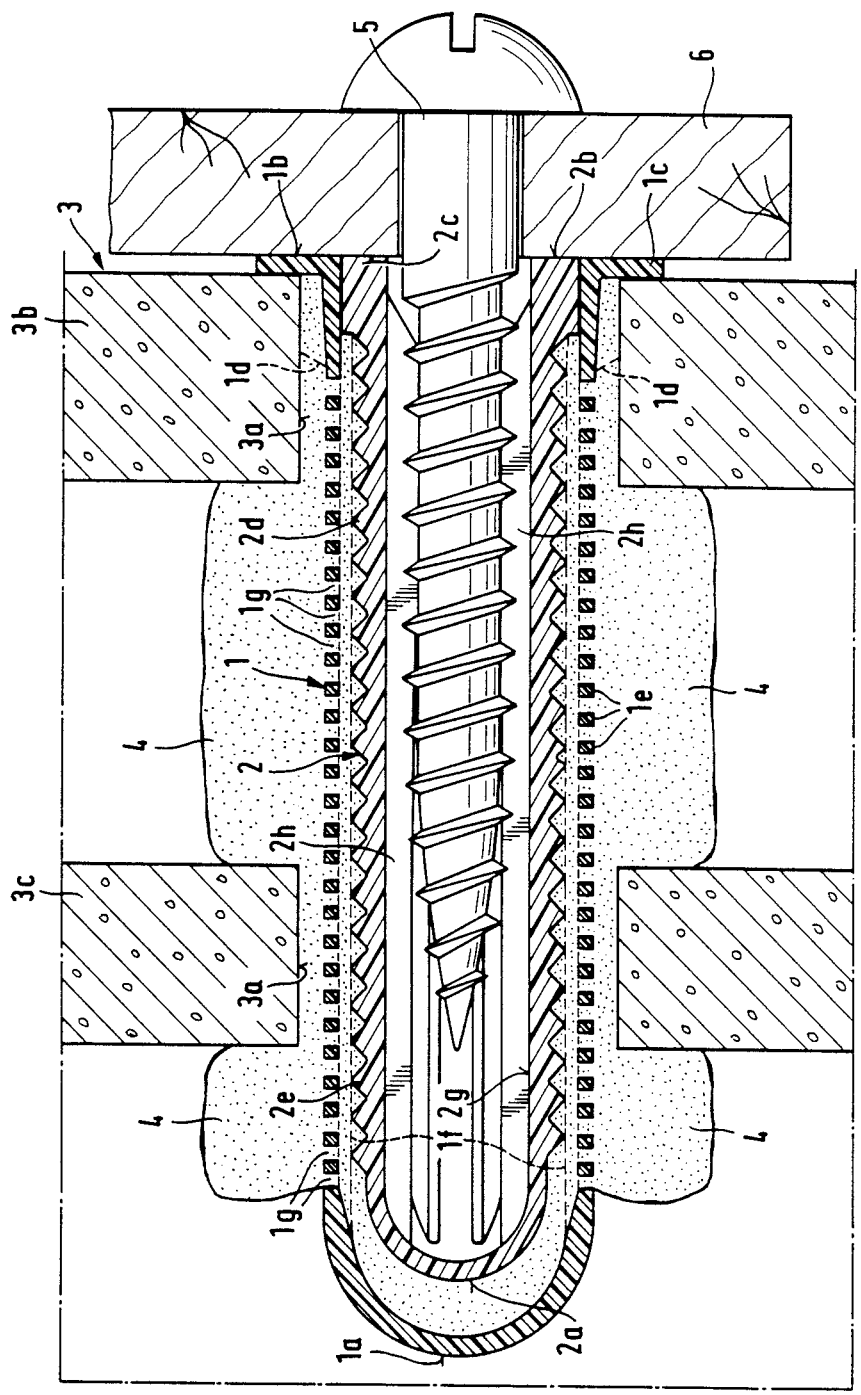

ANCHORING UNIT FOR USE IN STRUCTURES WITH INTERNAL OPEN SPACES

BACKGROUND OF THE INVENTION

The present invention is directed to an anchoring unit for securing fastening members to a support or receiving material containing internal open spaces with a hardenable mass securing the anchoring unit to the structure. The anchoring unit includes a screen-type sleeve with openings through it for the passage of the hardenable material or mass and an insert sleeve to be placed into the screen-type sleeve. The insert sleeve has an axially extending passage or bore for receiving the fastening member, with the fastening member being inserted into the trailing end of the insert sleeve.

Anchoring units formed of a screen-type sleeve and an insert sleeve and anchorable by a hardenable material or mass in hollow masonry and the like are known, note the brochure "Applications and Products 1985" of German Hilti GmbH. The screen-type sleeve, formed of a wire mesh, serves to distribute the hardenable mass into the open spaces in the structure, while the insert sleeve provides a detachable connection with a fastening member not directly secured by the hardenable mass. The transmission of the retaining force is achieved in this anchoring unit predominately by a positive locking connection afforded by the hardenable mass.

SUMMARY OF THE INVENTION

Therefore, the primary object of the present invention is to provide an improvement for an anchoring unit of the type mentioned above so that higher anchoring values are attained due to the improved positive lock between the screen-type sleeve and the insert sleeve and between the screen-type sleeve and the structure into which the anchoring unit is inserted. The locking action is effected by the setting action of the hardenable mass.

In accordance with the present invention, the screen-type sleeve and the insert sleeve each have alternating projecting surfaces and recessed surfaces on their inside and outside surfaces.

The surfaces of the screen-type sleeve and the insert sleeve are enlarged by the alternating surfaces affording an improved positive lock with the hardenable mass. As a result, higher anchoring value can be attained than with known anchoring units of the above-mentioned type.

The alternating surfaces on the outside surface of the screen-type sleeve are formed by circumferentially extending ribs disposed in spaced relation. Such circumferentially extending ribs provide good guidance and support for the strands of the hardenable mass exiting between the ribs around the entire outside periphery of the screen-type sleeve. This feature assures an effective and uniform force transmission to the structure receiving the anchoring unit. The alternating surfaces on the inside of the screen-type sleeve are formed preferably as axially extending webs. The webs are in spaced relation forming recesses between them. With the webs extending in the axial direction, a uniform distribution of the mass across the entire length of the screen-type sleeve is achieved. When the insert sleeve is introduced into the screen-type sleeve the hardenable mass is displaced rearwardly into the rear region of the screen sleeve between the webs extending in the axial direction and it can flow through the openings in this region into any open spaces in the structure.

The alternating surfaces on the outside of the insert sleeve are in the form of circumferentially extending annular projections spaced apart by recesses. Such circumferential annular projections have good deformation resistance and engage into an effective positive lock with the hardenable mass. By providing the projections with a rounded configuration, a uniform wetting of the entire surface of the insert sleeve by the hardenable mass is attained. Accordingly, an adhesive connection between the insert sleeve and the hardenable mass can develop apart from the positive lock.

Preferably, the projections on the outside of the insert sleeve can be in the form of thread turns. With thread turns as the circumferentially extending projections, a uniform distribution of the hardenable mass can take place along the insert sleeve. Since the hardenable mass is displaced rearwardly between the individual thread turns during the insertion of the insert sleeve, a uniform distribution of the hardenable mass across the outside periphery of the insert sleeve is achieved.

The configuration on the inside of the insert sleeve is in the form of web-like cleats extending in the axial direction and projecting radially inwardly. Such projections in a bar-like form are preferably elastically or plastically deformable enabling the reception of the fastening elements of different sizes. For instance, the same insert sleeve can be used to receive wood screws with 5 to 6 mm shank diameters.

The insert sleeve has axially extending recesses interrupting the projections on its outside surface. By properly shaping these recesses, the hardenable mass can flow rearwardly through the recesses when the insert sleeve is being introduced for wetting the entire surface of the insert sleeve. In addition, such recesses result in security against twisting of the insert sleeve within the hardenable mass.

For the economical fabrication of the anchoring unit, the screen-type sleeve and the insert sleeve are formed of plastics material. By the use of suitable plastics materials which are etched on their surfaces by the hardenable mass, a cold welding process can also be provided. Such cold welding develops higher extraction values and prevents turning of the insert sleeve together with the screw when the screw is threaded into the sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending view, partly in section, of a screen-type sleeve embodying the present invention;

FIG. 2 is a view of the trailing end of the screen-type sleeve taken in the direction of the arrow II in FIG. 1;

FIG. 3 is an axially extending view, partly in section, of an insert sleeve to be placed into the screen-type sleeve shown in FIG. 1;

FIG. 4 is a trailing end view of the insert sleeve taken in the direction of the arrow IV in FIG. 3; and FIG. 5 is an axially extending view, mostly in section, illustrating the combination of the screen-type sleeve and the insert sleeve of FIGS. 1 to 4 inserted into a structure.

DETAILED DESCRIPTION OF THE INVENTION

In FIGS. 1, 2 and 5, an axially elongated screen-type sleeve 1 is illustrated, having a semi-spherically shaped leading end 1a and a trailing end 1b. The trailing end 1b of the screen-type sleeve has an outwardly extending flange 1c, bearing against a structure or receiving material 3, note FIG. 5. The leading end 1a has a convex shape. This arrangement of the screen-type sleeve 1 facilitates its insertion into a borehole and also affords good distribution of a hardenable mass 4. The outside surface of the screen-type sleeve 1 has alternating projecting surfaces and recessed surfaces formed by the spaced circumferentially extending ribs 1e. The ribs are in spaced relation, note FIG. 1. The recessed surfaces between the ribs 1e form annular channels 1g with the channels being spaced apart by the ribs. As can be seen best in FIG. 2, the inside surface of the screen-type sleeve 1 is provided with alternating inwardly projecting surfaces and recessed surfaces with the inwardly projecting surfaces formed by axially extending webs 1f. Openings 1g extend from the inside to the outside surface of the screen-type sleeve for the passage of the hardenable mass 4 outwardly through the sleeve. The openings 1g are located on the inside between the axially extending webs 1f and on the outside between the circumferentially extending ribs 1e. At its trailing end, the screen-type sleeve has fins 1d on a collar-like section extending between the flange 1c and the trailing end of the ribs 1e. Fins 1d reinforce the flange 1c.

In FIGS. 3, 4 and 5, an insert sleeve 2 is shown having a leading end 2a and a trailing end 2b. Leading end 2a is closed and has a semi-spherical shape. A relatively short axially extending collar 2c is located at the trailing end 2b of the insert sleeve 2. Starting at the collar 2c, the outside surface of the insert sleeve 2 is shaped with alternating projecting and recessed surfaces. These alternating projecting and recessed surfaces are formed by circumferentially extending annular projections 2d, followed toward the leading end of the insert sleeve by thread turns 2e. The projections 2d and the thread turns 2e are basically the same configuration; however, the thread turns 2e extend in a helical fashion. The annular projections 2d and the thread turns 2e are interrupted by axially extending recesses 2f formed as grooves in the axial direction of the insert sleeve with the grooves extending over the axial length of the sleeve between the leading end of the thread turns 2e and the collar 2c. Recesses 2f serve for uniform distribution of the hardenable mass when the insert sleeve 2 is placed into the screen-type sleeve 1 filled with such mass, so that the hardenable mass is displaced through the recesses into the trailing region of the screen-type sleeve 1. Insert sleeve 2 has an opening 2g at its trailing end, opening into an axially extending passageway, receiving a fastening member inserted into the sleeve from the trailing end 2b. The inside surface of the sleeve 2, that is, the axially extending opening or bore into which the fastening member is inserted, has alternating projecting and recessed surfaces extending in the axial direction with the projecting surfaces extending radially inwardly. Cleat-like or bar-shaped members 2h form the inwardly directed projections and afford adaption to different diameters of the fastening members to be inserted into the sleeve. As can be seen in FIG. 4, the members 2h have radially extending surfaces tapering inwardly toward the center of the insert sleeve. The axially extending members 2h extend from adjacent the trailing end 2b, to adjacent the leading end 2a of the insert sleeve 2.

In the installing or setting procedure, initially a screen-type sleeve 1 is inserted into a borehole 3a in a structure 3. The structure 3 has internal open spaces as can be seen in FIG. 5. Next, a quantity of a hardenable mass 4 is injected into the screen-type sleeve 1 and flows through the openings 1g in the screen-type sleeve into the open spaces formed between the outer wall 3b and an intermediate wall 3c, or inwardly of the intermediate wall 3c, forming the structure 3. In the next step, an insert sleeve 2 is inserted into the interior of the screen-type sleeve 1. The hardenable mass remaining within the screen-type sleeve 1 is displaced outwardly by the insert sleeve 2 through the screen-type sleeve. The hardenable mass 4 forms a positive lock with the structure. After the mass 4 hardens, a fastening member, such as a screw 5, appropriately adapted to the member or object 6 is threaded into the insert sleeve 2. The attachment of the object 6 can be removed without problem at any time.

Preferably, the screen-type sleeve 1 and the insert sleeve 2 are formed of a plastics material. Such material affords simple and economical fabrication of both sleeves. By selecting a suitable plastics material, the screen-type sleeve 1 and the insert sleeve 2 are etched by the hardenable mass on their surfaces and a cold welding joint is formed between the hardenable mass and the screen-type sleeve 1, and the insert sleeve 2. Such a connection provides an additional increase in the anchoring value. Only a small amount of the hardenable mass 4 is required for each of the anchoring units, accordingly, the system is economical, especially in cases where in the past expensive and time-consuming special dowels and processes were needed. The distribution of the load over a large volume prevents chipping or spalling of the structure if it is a brittle material.

While specific embodiments of the invention have been shown and described in detail to illustrate the application of the inventive principles, it will be understood that the invention may be embodied otherwise without departing from such principles.

We claim:

1. Anchoring unit for use in a structure with internal open spaces for securing a fastening member in the structure by means of a hardenable mass, comprising an axially extending screen-type sleeve having a leading end for insertion first into a borehole in the structure so that it extends into the open spaces within the structure and a trailing end, said screen-type sleeve being open at the trailing end with an open inner first passage extending from the trailing end toward the leading end and having openings therethrough for passage of the hardenable mass from the passage within said screen-type sleeve to outside of said screen-type sleeve, an axially elongated insert sleeve insertable into the first passage in said screen-type sleeve and having a leading end and a trailing end and an opening at the trailing end of said insert sleeve opening into an axially elongated second passage extending from the trailing end toward the leading end thereof, said second passage arranged to receive a fastening member insertable therein, wherein the improvement comprises that said screen-type sleeve and said insert sleeve each has an axially extending inside and outside surface and each of said inside and outside surfaces have alternating projecting and recessed surfaces.

2. Anchoring unit, set forth in claim 1, wherein said alternating projecting and recessed surfaces on the outside surface of said screen-type sleeve comprise spaced circumferentially extending ribs with annular recesses therebetween.

3. Anchoring unit, as set forth in claim 2, wherein said alternating projecting and recessed surfaces on the inside surface of said screen-type sleeve comprise axially extending webs projecting radially inwardly and disposed in spaced relationship forming the recessed surfaces therebetween.

4. Anchoring unit, as set forth in claim 3, wherein the alternating projecting and recessed surfaces on the outside surface of said insert sleeve comprise circumferentially extending annular projections (2d).

5. Anchoring unit, as set forth in claim 4, wherein said projections comprise a plurality of thread turns with the recessed surfaces defined between the thread turns.

6. Anchoring unit, as set forth in claim 4, wherein the alternating projecting and recessed surfaces in the inside surface of said insert sleeve comprise a plurality of spaced axially extending bar-like members projecting radially inwardly with the recessed surfaces formed therebetween.

7. Anchoring unit, as set forth in claim 5, wherein axially extending recesses are formed in the outside surface of said insert sleeve with the recesses extending through said projecting surfaces and extending from adjacent the leading end to adjacent the trailing end of said insert sleeve.

8. Anchoring unit, as set forth in claim 1, wherein said screen-type sleeve and said insert sleeve are formed of a plastics material.

* * * * *